United States Patent
Bae

(10) Patent No.: US 10,825,198 B2
(45) Date of Patent: Nov. 3, 2020

(54) 3 DIMENSIONAL COORDINATES CALCULATING APPARATUS, 3 DIMENSIONAL COORDINATES CALCULATING METHOD, 3 DIMENSIONAL DISTANCE MEASURING APPARATUS AND 3 DIMENSIONAL DISTANCE MEASURING METHOD USING IMAGES

(71) Applicant: CUPIX, INC., Seongnam-si (KR)

(72) Inventor: SeockHoon Bae, Seoul (KR)

(73) Assignee: CUPIX, INC., Seongnam-si (KR)

( * ) Notice: Subject to any disclaimer, the term of this patent is extended or adjusted under 35 U.S.C. 154(b) by 0 days.

(21) Appl. No.: 16/447,665

(22) Filed: Jun. 20, 2019

(65) Prior Publication Data
US 2019/0392609 A1   Dec. 26, 2019

(30) Foreign Application Priority Data

Jun. 20, 2018   (KR) .................... 10-2018-0071021

(51) Int. Cl.
*G06T 7/73*   (2017.01)
*G06T 7/55*   (2017.01)
*H04N 5/247*   (2006.01)

(52) U.S. Cl.
CPC .............. *G06T 7/74* (2017.01); *G06T 7/55* (2017.01); *H04N 5/247* (2013.01); *G06T 2207/20101* (2013.01)

(58) Field of Classification Search
CPC ... G06T 7/74; G06T 7/55; G06T 2207/20101; G06T 2207/10028; H04N 5/247
See application file for complete search history.

(56) References Cited

U.S. PATENT DOCUMENTS

| | | | | |
|---|---|---|---|---|
| 5,990,900 A * | 11/1999 | Seago | ..................... | G06T 7/536 345/419 |
| 6,278,460 B1 * | 8/2001 | Myers | ..................... | G06T 15/06 345/420 |
| 9,558,584 B1 * | 1/2017 | Lo | ............................. | B60R 1/00 |
| 2004/0247174 A1 * | 12/2004 | Lyons | ..................... | G06T 17/10 382/154 |
| 2018/0101732 A1 * | 4/2018 | Uchiyama | .......... | G06K 9/00771 |
| 2019/0026948 A1 * | 1/2019 | Kellogg | ................. | G06T 7/246 |

FOREIGN PATENT DOCUMENTS

| | | |
|---|---|---|
| JP | 2017-191022 A | 10/2017 |
| KR | 10-2017-0142265 A | 12/2017 |

* cited by examiner

*Primary Examiner* — Richard A Hansell, Jr.
(74) *Attorney, Agent, or Firm* — Knobbe Martens Olson & Bear LLP

(57) ABSTRACT

Provided is a three-dimensional locations calculating apparatus using photographic images and a three-dimensional locations calculation method by using photographic images, and more particularly, to a three-dimensional locations calculating apparatus using photographic images and a three-dimensional location calculation method by using photographic images, in which a plurality of photographic images are analyzed to calculate three-dimensional locations of a point that is commonly marked on the photographic images.

17 Claims, 8 Drawing Sheets

3 DIMENSIONAL COORDINATES CALCULATING APPARATUS, 3 DIMENSIONAL COORDINATES CALCULATING METHOD, 3 DIMENSIONAL DISTANCE MEASURING APPARATUS AND 3 DIMENSIONAL DISTANCE MEASURING METHOD USING IMAGES

CROSS-REFERENCE TO RELATED APPLICATION

This application claims the benefit of Korean Patent Application No. 10-2018-0071021, filed on Jun. 20, 2018, in the Korean Intellectual Property Office, the disclosure of which is incorporated herein in its entirety by reference.

BACKGROUND

Field

The present disclosure relates to a three-dimensional locations calculating apparatus using photographic images and a three-dimensional locations calculation method by using photographic images.

Description of the Related Art

In order to measure a distance between two points in a space, various measuring devices such as a tape measure, a laser distance sensor or the like may be used. When measuring a distance between two points in a space by using such a measuring device, a method of measuring and recording a distance between main points or representative points of a space is typically used.

It is practically difficult to measure three-dimensional locations of every point in a space or to measure a distance between two arbitrary points in a space due to constraints in the work environment or time constraints.

After completing survey of main points in a space, there is frequently the need to additionally measure a distance between two points in the space during a construction work, a building design work, or a remodeling work of a building. In such cases, visiting the construction site and doing survey or distance measurement again is very burdensome, inefficient, and decreases productivity.

SUMMARY

One or more embodiments relate to a three-dimensional locations calculating apparatus using photographic images and a three-dimensional location calculation method by using photographic images, in which a plurality of photographic images are analyzed to calculate three-dimensional locations of a point that is commonly marked on the photographic images.

One or more embodiments relate to a three-dimensional distance measuring apparatus using photographic images and a three-dimensional distance measurement method by using photographic images, and more particularly, to a three-dimensional distance measuring apparatus and a three-dimensional distance measurement method by using photographic images, in which a plurality of photographic images are analyzed to calculate three-dimensional locations of a point that is commonly marked on the photographic images and calculate a distance between two points based on a result of the calculation of the three-dimensional locations of the point marked on the photographic images.

One or more embodiments provide a three-dimensional locations calculating apparatus using photographic images and a three-dimensional locations calculation method by using photographic images, in which three-dimensional locations of arbitrary points marked on photographic images captured using a camera may be calculated using the photographic images.

One or more embodiments provide a three-dimensional distance measuring apparatus using photographic images and a three-dimensional distance measurement method by using photographic images, in which a distance between two points may be measured by calculating three-dimensional locations of arbitrary points marked on photographic images captured using a camera, by using the photographic images.

Additional aspects will be set forth in part in the description which follows and, in part, will be apparent from the description, or may be learned by practice of the presented embodiments.

According to one or more embodiments, a method of calculating three-dimensional locations by using photographic images, in which three-dimensional locations of a target position that is commonly marked on a plurality of photographic images captured using a camera are calculated by using the plurality of photographic images, wherein the method includes: (a) receiving, by a photographic image locations module, locations of the target position on each of the plurality of photographic images marked on the plurality of photographic images, as image locations; (b) achieving, by a camera information module, as camera information, a camera direction corresponding to a direction in which the plurality of photographic images are captured and a camera position corresponding to locations of a projection center point; (c) calculating, by a projection point calculation module, locations of a projection point corresponding to a position where the target position is marked on a projection surface of the camera placed based on the camera information corresponding to the plurality of photographic images, by using the image locations; (d) respectively calculating, by an imaginary straight line calculation module, imaginary straight lines respectively connecting the projection points of the plurality of photographic images to the camera position of the camera information; and (e) determining, by a target position calculation module, locations of a point in a region where a distance between the point and the imaginary straight lines is shortest, as three-dimensional locations of the target position.

According to one or more embodiments, a method of measuring a three-dimensional distance by using photographic images, a distance between target positions marked on a plurality of photographic images captured using a camera are calculated by using the plurality of photographic images, is provided, wherein the method includes: (a) receiving, by an image locations module, locations of the target position on each of the plurality of photographic images marked on the plurality of photographic images, as image locations; (b) achieving, by a camera information module, as camera information, a camera direction corresponding to a direction in which the plurality of photographic images are captured and a camera position corresponding to locations of a projection center point; (c) calculating, by a projection point calculation module, locations of a projection point corresponding to a position where the target position is marked on a projection surface of the camera placed based on the camera information corresponding to the plurality of photographic images, by using the image locations; (d) respectively calculating, by an imaginary straight line calculation module, imaginary straight lines respectively connecting the projection points of the plurality of photographic images to the camera position of the camera information; and (e) determining, by a target position calculation module, locations of a point in a region where a distance between the point and the imaginary straight lines is shortest, as three-dimensional locations of the target position; (f) respectively calculating three-dimensional locations of a first target position and a second target position by using (a) through (e); (g) acquiring an absolute scale, by which a scale module converts a relative distance into an absolute distance; and (h) calculating, by a distance calculation module, an absolute distance between the first target position and the second target position by using the absolute scale.

According to one or more embodiments, a three-dimensional locations calculating apparatus using photographic images, in which three-dimensional locations of a target position that is commonly marked on a plurality of photographic images captured using a camera are calculated by using the plurality of photographic images, is provided, wherein the three-dimensional locations calculating apparatus includes: an image locations module receiving locations of the target position on each of the plurality of photographic images marked on the plurality of photographic images, as image locations; a camera information module achieving, as camera information, a camera direction corresponding to a direction in which the plurality of photographic images are captured and a camera position corresponding to locations of a projection center point; a projection point calculation module calculating locations of a projection point corresponding to a position where the target position is marked on a projection surface of the camera placed based on the camera information corresponding to the plurality of photographic images, by using the image locations; an imaginary straight line calculation module respectively calculating imaginary straight lines respectively connecting the projection points of the plurality of photographic images to the camera position of the camera information; and a target position calculation module determining locations of a point in a region where a distance between the point and the imaginary straight lines is shortest, as three-dimensional locations of the target position.

According to one or more embodiments, a three-dimensional distance measuring apparatus using photographic images, in which a distance between a first target position and a second target position from among target positions that are commonly marked on a plurality of photographic images captured using a camera is calculated by using the plurality of photographic images, is provided, wherein the three-dimensional distance measuring apparatus includes: a scale module acquiring an absolute scale, by which a relative distance is converted into an absolute distance; an image locations module receiving locations of the target positions on each of the plurality of photographic images marked on the plurality of photographic images, as image locations; a camera information module achieving, as camera information, a camera direction corresponding to a direction in which the plurality of photographic images are captured and a camera position corresponding to locations of a projection center point; a projection point calculation module calculating locations of a projection point corresponding to a position where the target position is marked on a projection surface of the camera placed based on the camera information corresponding to the plurality of photographic images, by using the image locations; a calculation module respectively calculating imaginary straight lines respectively connecting the projection points of the plurality of photographic images to the camera position of the camera information; a target position calculation module determining locations of a point in a region where a distance between the point and the imaginary straight lines is shortest, as three-dimensional locations of the target position; and a distance calculation module calculating an absolute distance between the first target position and the second target position by using three-dimensional locations of the first and second target positions calculated using the image locations module, the camera information module, the projection point calculation module, the calculation module, and the target position calculation module and the absolute scale acquired using the scale module.

According to one or more embodiments, a method of processing two or more different photographs to determine a three-dimensional location of a feature commonly captured in the two or more different photographs, the method comprising: inputting, to a computerized system, a first photographic image of a place taken by a first camera or first data representing the first photographic image; inputting, to the computerized system, a second photographic image of the place taken by a second camera or second data representing the second photographic image; providing, to the computerized system, a three-dimensional (3D) location (or 3D coordinate) of a first optical center of the first camera at the time the first photographic image was taken; providing, to the computerized system, a 3D location of a second optical center of the second camera at the time the second photographic image was taken; providing, to the computerized system, a direction of a first optical axis of the first camera at the time the first photographic image was taken; providing, to the computerized system, a direction of a second optical axis of the second camera at the time the second photographic image was taken; providing, to the computerized system, a two-dimensional (2D) size of a first projection surface, on which an optical image is projected inside the first camera for capturing the optical image, or information leading to the 2D size of the first projection surface of the first camera; providing, to the computerized system, a 2D size of a second projection surface, on which an optical image is projected inside the second camera for capturing the optical image, or information leading to the 2D size of the second projection surface of the second camera; providing, to the computerized system, a first distance between the first optical center and the first projection surface along the first optical axis or information leading to the first distance of the first camera; providing, to the computerized system, a second distance between the second optical center and the second projection surface along the second optical axis or information leading to the second distance of the second camera; receiving a first selection of a first point representing a target position of the place on the first photographic image displayed on at least one display screen of the computerized system; receiving a second selection of a second point representing the target position on the second photographic image displayed on the at least one display screen of the computerized system; and causing at least one processor of the computerized system to execute computer software stored in at least one memory of the computerized system to perform the following: processing the first photographic image, the 2D size of the first projection surface, the direction of the first optical axis, and the first distance to compute a 3D location of a first projection point at which the target position of the place would have been projected on the first projection surface, or on an imaginary plane parallel to the first projection surface, at the time the first photographic image was taken by the first camera, processing the second photographic image, the 2D size of the second projection surface, the direction of the second optical axis, and the second distance to compute a 3D location of a second projection point at which the target position of the place would have been projected on the second projection surface, or an imaginary plane parallel to the second projection surface, at the time the second photographic image was taken by the second camera, and processing the 3D location of the first projection point, the 3D location of the first optical center, the 3D location of the second projection point, and the 3D location of the second optical center to compute a 3D location of the target position of the place as a first imaginary straight line passing the 3D location of the first projection point and the 3D location of the first optical center would also pass or pass by the target position and further a second imaginary straight line passing the 3D location of the second projection point and the 3D location of the second optical center would also pass or pass by the target position such that the first imaginary straight line and the second imaginary straight line cross or are close to each other at or near the target position, wherein the 3D location defines a location relative to a reference point in a 3D space.

According to one or more embodiments, a method of processing two or more different photographs to determine a three-dimensional location of a feature commonly captured in the two or more different photographs, wherein the second camera is the first camera or another camera, wherein the first photographic image and the second photographic image are two-dimensional images of the place and taken from different locations of the place such that some features of the place are depicted in both of the first photographic image and the second photographic image.

According to one or more embodiments, a method of processing two or more different photographs to determine a three-dimensional location of a feature commonly captured in the two or more different photographs, wherein processing to compute the 3D location of the first projection point on the first projection surface comprises: processing the first photographic image to determine a 2D size of the first photographic image; processing the first photographic image to determine a 2D location (or 2D coordinate) of the first point on the first photographic image; subsequently, processing the 2D size of the first projection surface, the 2D size of the first photographic image, and the 2D location of the first point on the first photographic image to determine a 2D location (or 2D coordinate) of the first projection point on the first projection surface that corresponds to the first point on the first photographic image; and subsequently, processing the direction of the first optical axis, the 3D location of the first optical center, the first distance, and the 2D location of the first projection point on the first projection surface to determine the 3D location of the first projection point at which the target position would have been projected on the first projection surface at the time the first photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein in determining the 2D location of the first projection point on the first projection surface, the 2D size of the first projection surface and the 2D size of the first photographic image are used to provide a ratio therebetween.

According to one or more embodiments, a method of processing two or more different photographs to determine a three-dimensional location of a feature commonly captured in the two or more different photographs, wherein determining the 2D location of the first projection point on the first projection surface further comprises mapping the first point on the first photographic image on the first projection surface in view of the ratio between the 2D size of the first projection surface and the 2D size of the first photographic image.

According to one or more embodiments, a method of processing two or more different photographs to determine a three-dimensional location of a feature commonly captured in the two or more different photographs, wherein the first point on the first photographic image is mapped on the first projection surface given that the first projection point on the first projection surface and the first point on the first photographic image are point symmetric to the first optical axis.

According to one or more embodiments, a method of processing two or more different photographs to determine a three-dimensional location of a feature commonly captured in the two or more different photographs, wherein in determining the 3D location of the first projection point, the direction of the first optical axis is used to determine an orientation of the first projection surface at the time the first photographic image was taken as the direction of the first optical axis is perpendicular to the first projection surface.

According to one or more embodiments, a method of processing two or more different photographs to determine a three-dimensional location of a feature commonly captured in the two or more different photographs, wherein in determining the 3D location of the first projection point, the 3D location of the first optical center and the first distance are used to provide a 3D location of the first projection surface in the 3D space.

According to one or more embodiments, a method of processing two or more different photographs to determine a three-dimensional location of a feature commonly captured in the two or more different photographs, wherein the 2D location of the first projection point on the first projection surface and to the 3D location of the first projection surface are processed to provide the 3D location of the first projection point in the 3D space.

According to one or more embodiments, a method of processing two or more different photographs to determine a three-dimensional location of a feature commonly captured in the two or more different photographs, wherein processing to compute the 3D location of the second projection point comprises: processing the second photographic image to determine a 2D size of the second photographic image; processing the second photographic image to determine a 2D location (or 2D coordinate) of the second point on the second photographic image; subsequently, processing the 2D size of the second projection surface, the 2D size of the second photographic image, and the 2D location of the second point on the second photographic image to determine a 2D location (or 2D coordinate) of the second projection point on the second projection surface that corresponds to the second point on the second photographic image; and subsequently, processing the direction of the second optical axis, the 3D location of the second optical center, the second distance, and the 2D location of the second projection point on the second projection surface to determine the 3D location of the second projection point at which the target position would have been projected on the second projection surface at the time the second photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein processing to compute the 3D location of the first projection point on the imaginary plane parallel to the first projection surface comprises: processing the first photographic image to determine a 2D size of the first photographic image; processing the first photographic image to determine a 2D location of the first point on the first photographic image; subsequently, processing the 2D size of the first projection surface, the 2D size of the first photographic image, and the 2D location of the first point on the first photographic image, the first distance, and an imaginary projection distance between the imaginary plane and the first optical center in the first optical axis to determine a 2D location of the first projection point on the imaginary plane parallel to the first projection surface that corresponds to the first point on the first photographic image; and subsequently, processing the direction of the first optical axis, the 3D location of the first optical center, the first distance, and the 2D location of the first projection point on the imaginary plane parallel to the first projection surface to determine the 3D location of the first projection point at which the target position would have been projected on the imaginary plane parallel to the first projection surface at the time the first photographic image was taken, wherein the 2D location defines a location relative to a reference point in a 2D plane.

According to one or more embodiments, a method of processing two or more different photographs to determine a three-dimensional location of a feature commonly captured in the two or more different photographs, wherein in determining the 2D location of the first projection point on the imaginary plane, the first distance and the imaginary projection distance are used to provide a first ratio therebetween, and the 2D size of the first projection surface and the first ratio are used to provide a 2D size of the imaginary plane.

According to one or more embodiments, a method of processing two or more different photographs to determine a three-dimensional location of a feature commonly captured in the two or more different photographs, wherein the 2D size of the imaginary plane and the 2D size of the first photographic image are used to provide a second ratio therebetween.

According to one or more embodiments, a method of processing two or more different photographs to determine a three-dimensional location of a feature commonly captured in the two or more different photographs, wherein determining the 2D location of the first projection point on the first projection surface further comprises mapping the first point on the first photographic image on the imaginary plane in view of the second ratio between the 2D size of the imaginary plane and the 2D size of the first photographic image.

According to one or more embodiments, a method of processing two or more different photographs to determine a three-dimensional location of a feature commonly captured in the two or more different photographs, wherein the first point on the first photographic image is mapped on the imaginary plane given that, the first projection point on the imaginary plane and the first point on the first photographic image are point symmetric to the first optical axis.

According to one or more embodiments, a method of processing two or more different photographs to determine a three-dimensional location of a feature commonly captured in the two or more different photographs, wherein when the first imaginary straight line and the second imaginary straight line cross, the target position is a point where the first imaginary straight line and the second imaginary straight line cross in the 3D space.

According to one or more embodiments, a method of processing two or more different photographs to determine a three-dimensional location of a feature commonly captured in the two or more different photographs, wherein when the first imaginary straight line and the second imaginary straight line do not cross, computing the 3D location of the target position comprises: determining a shortest straight line interconnecting between the first imaginary straight line the second imaginary straight line; and determining the target position in the 3D space using the shortest straight line.

According to one or more embodiments, a method of processing two or more different photographs to determine a three-dimensional location of a feature commonly captured in the two or more different photographs, further comprising: inputting, to the computerized system, a third photographic image of a place taken by a third camera or third data representing the third photographic image; wherein the third camera is the first camera, the second camera or another camera, wherein the third photographic image is a two-dimensional image of the place and taken from a different location from the first and second photographic images such that some features of the place are depicted in the first photographic image, the second photographic image and the third photographic image; providing, to the computerized system, a 3D location of a third optical center of the third camera at the time the third photographic image was taken; providing, to the computerized system, a direction of a third optical axis of the third camera at the time the third photographic image was taken; providing, to the computerized system, a 2D size of a third projection surface, on which an optical image is projected inside the third camera for capturing the optical image, or information leading to the 2D size of the third projection surface of the third camera; providing, to the computerized system, a third distance between the third optical center and the third projection surface along the third optical axis or information leading to the third distance of the third camera; receiving a third selection of a third point representing the target position on the third photographic image displayed on at least one display screen of the computerized system; and causing at least one processor of the computerized system to execute computer software stored in at least one memory of the computerized system to perform the following: processing the third photographic image, the 2D size of the third projection surface, the direction of the third optical axis, and the third distance to compute a 3D location of a third projection point at which the target position of the place would have been projected on the third projection surface, or on an imaginary plane parallel to the third projection surface, at the time the third photographic image was taken by the third camera, processing the 3D location of the third projection point, and the 3D location of the third optical center to compute the 3D location of the target position of the place as third imaginary straight line passing the 3D location of the third projection point and the 3D location of the third optical center would also pass or pass by the target position such that the third imaginary straight line and the first imaginary straight line cross or are close to each other at or near the target position and further such that the third imaginary straight line and the second imaginary straight line cross or are close to each other at or near the target position.

According to one or more embodiments, a method of processing two or more different photographs to determine a three-dimensional location of a feature commonly captured in the two or more different photographs, wherein when the third imaginary straight line and the first imaginary straight line do not cross and when the third imaginary straight line and the second imaginary straight line do not cross, computing the 3D location of the target position comprises: determining a first shortest straight line interconnecting between the first imaginary straight line the second imaginary straight line; determining a second shortest straight line interconnecting between the second imaginary straight line the third imaginary straight line; determining a third shortest straight line interconnecting between the third imaginary straight line the first imaginary straight line; and determining the target position in the 3D space using the first shortest straight line, the second shortest straight line, and the third shortest straight line.

According to one or more embodiments, a method of processing two or more different photographs to determine a three-dimensional location of a feature commonly captured in the two or more different photographs, wherein the target position is determined within a space defined by the first shortest straight line, the second shortest straight line, and the third shortest straight line.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosures are discussed in detail below with reference to the attached drawings.

While absolute depths of the surroundings may be measured using equipment such as a three-dimensional scanner, it is difficult to use the equipment due to the high price of the equipment. In addition, even when using a three-dimensional scanner, it is difficult to obtain a reliable level of three-dimensional locations of all points of a space due to limitations in a resolution of the equipment or space restraints.

If three-dimensional locations of an arbitrary point in a space could be obtained within an allowable error range by using photographic images captured using a camera and without expensive equipment such as a three-dimensional scanner, time and effort required for measurement of the space may be saved, and productivity may be significantly improved. For example, if a distance between two points can be calculated just by selecting two points required to be measured, from photographic images that are captured in advance, without visiting the site every time to survey required dimensions, then productivity of architectural operations may be remarkably raised.

In addition, if measurement of the above-described type is possible, it may be possible to efficiently verify errors in the dimensions during a construction process of a building or survey a building in order to inspect safety of the building.

Figure 1:
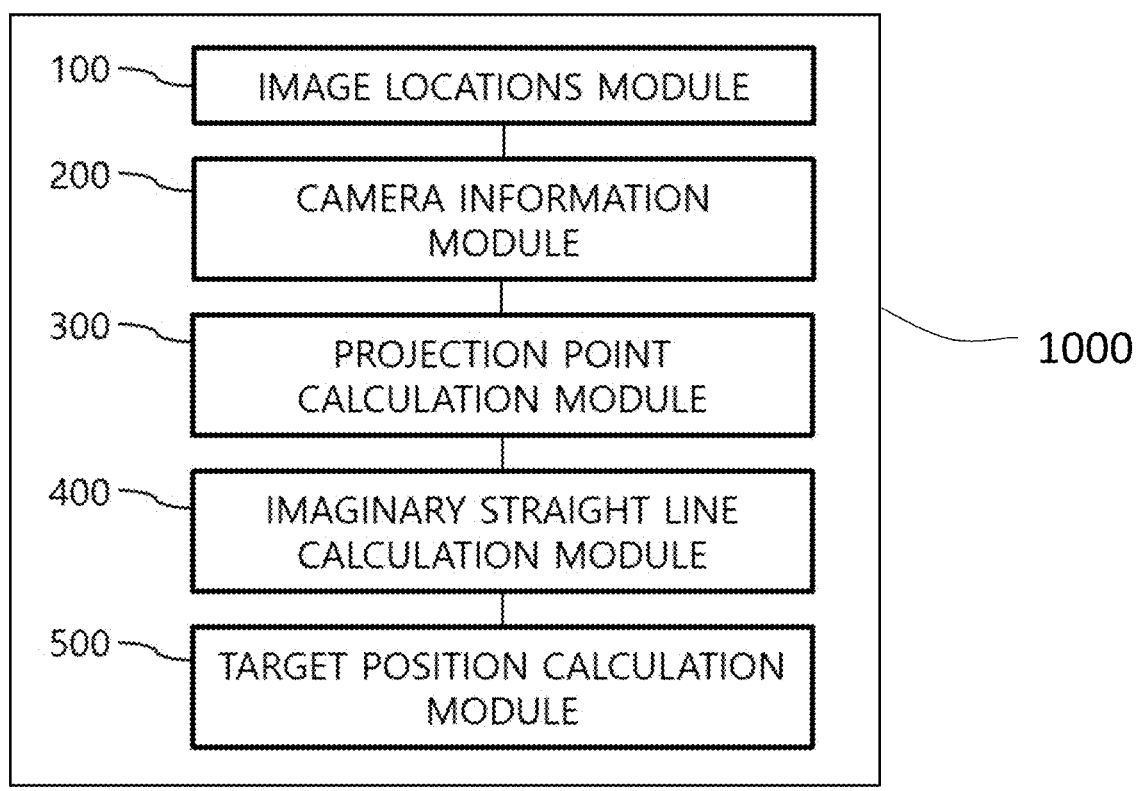
FIG. 1 is a block diagram of a three-dimensional locations calculating apparatus using photographic images, according to an embodiment of the present disclosure.
Figure 3:
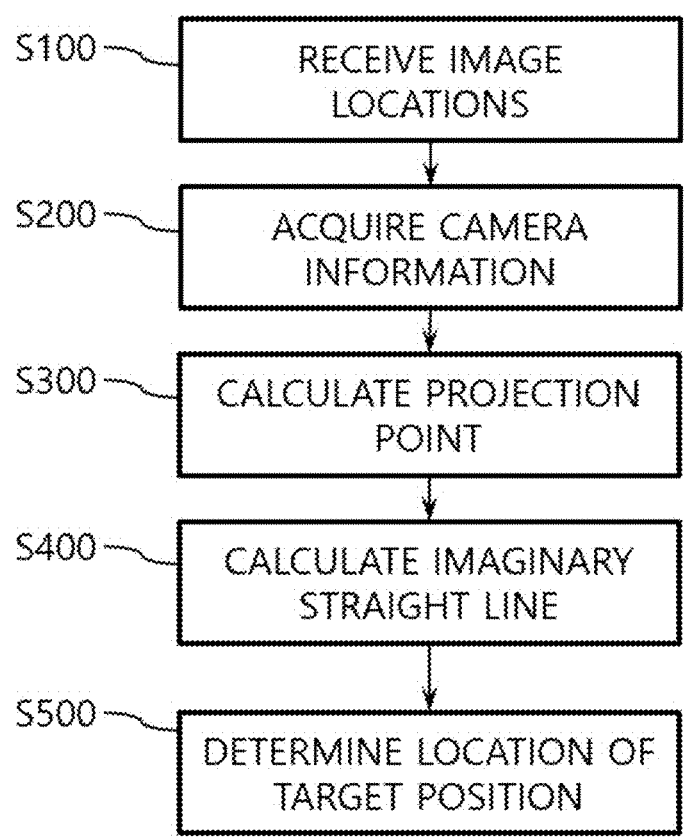
FIG. 3 is a flowchart of a three-dimensional locations calculation method, by using photographic images, according to an embodiment of the present disclosure.

FIG. 1 is a block diagram of a three-dimensional locations calculating apparatus using photographic images, according to an embodiment of the present disclosure. FIG. 3 is a flowchart of a three-dimensional locations calculation method, by using photographic images, according to an embodiment of the present disclosure.

The three-dimensional locations calculating apparatus using photographic images, and the three-dimensional location calculation method by using photographic images, according to the present disclosure, are directed to calculate three-dimensional locations of points marked on a plurality of photographic images captured using a camera, by using the photographic images. By calculating three-dimensional locations of target positions commonly marked on a plurality of photographic images, according to the present disclosure, the calculation may be used for various purposes, for example, in measuring a distance between points marked on photographic images by using just the photographic images.

Referring to FIG. 1, the three-dimensional locations calculating apparatus 1000 using photographic images, according to the present embodiment, includes an image locations module 100, a camera information module 200, a projection point calculation module 300, an imaginary straight line calculation module 400, and a target position calculation module 500.

The image locations module 100 receives, as image locations, 2 dimensional locations of a target position on photographical photographic images, wherein three-dimensional locations of the target positions are to be calculated and the target position is marked on the respective photographic images (step (a); S100). For example, the image locations module 100 receives image locations of a target position in the form of 2 dimensional locations. Various input devices may be used to receive image locations. For example, the image locations module 100 that receives image locations of a target position through a user's clicking the target position on a photographic image displayed on a display device of a computer by using a mouse may be used. When a user inputs locations of a same target position marked on two or more photographic images by using this method, the image locations module 100 receives locations on the respective photographic images, at which the target position is marked, and stores the locations.

The camera information module 200 acquires a position and direction of a camera that has captured the photographic images on which the target position is marked, as camera information (step (b); step S200). A position of a camera or a location of an optical center and direction of a camera or a direction of an optical axis when the camera is capturing a photographic image will be defined and described as camera information below. A camera position of camera information is identical to locations of a projection center point (view point) of a camera.

The camera information module 200 may acquire camera information by using various methods.

First, the camera information module 200 may acquire camera information by using a computer vision structure from motion (SfM) method. The computer vision SfM method is a technique of calculating structural information including three-dimensional locations and a direction of a camera when the camera is taking pictures by analyzing just photographic images of the pictures.

Second, when capturing a photographic image by using a camera, camera information may be calculated based on measurement values or variation of measurement values according to time obtained using various types of sensors such as an inertial measurement unit (IMU), an acceleration sensor, a geomagnetic sensor, an angular displacement sensor or the like or in. For example, a variation of a displacement may be calculated by integrating an acceleration twice, and thus, camera information may be calculated accurately or quickly by using values calculated as described above.

Camera information may also be acquired using the computer vision SfM method and measurement values of various sensors in combination.

According to circumstances, an additional apparatus may store a position and direction of a camera, measured each time when a photographic image is captured, and the camera information module 200 may use camera information stored as above.

The projection point calculation module 300 calculates three-dimensional locations of a position where a target position is marked on a projection surface of a camera placed in a three-dimensional space based on the camera information acquired using the camera information module 200 (step (c); S300). A target position marked on a projection surface of a camera will be defined and described as a projection point below. A projection surface of a camera corresponds to a film or an image sensor of a camera. In digital cameras, for example, a complementary metal-oxide semiconductor (CMOS) image sensor or a charge-coupled device (CCD) image sensor corresponds to a projection surface. A distance between an optical center and a projection surface of a camera and a 2D size of the projection surface correspond to camera intrinsic parameters, and thus, values of the distance between the optical center and the projection surface and the size of the projection surface may be acquired from information about the camera. By using the camera information, the 2D size of the projection surface and the distance between the optical center and the projection surface, and 2D location of a target position on the photographic image, the projection point calculation module 300 may calculate three-dimensional locations of the projection point.

Figure 5:
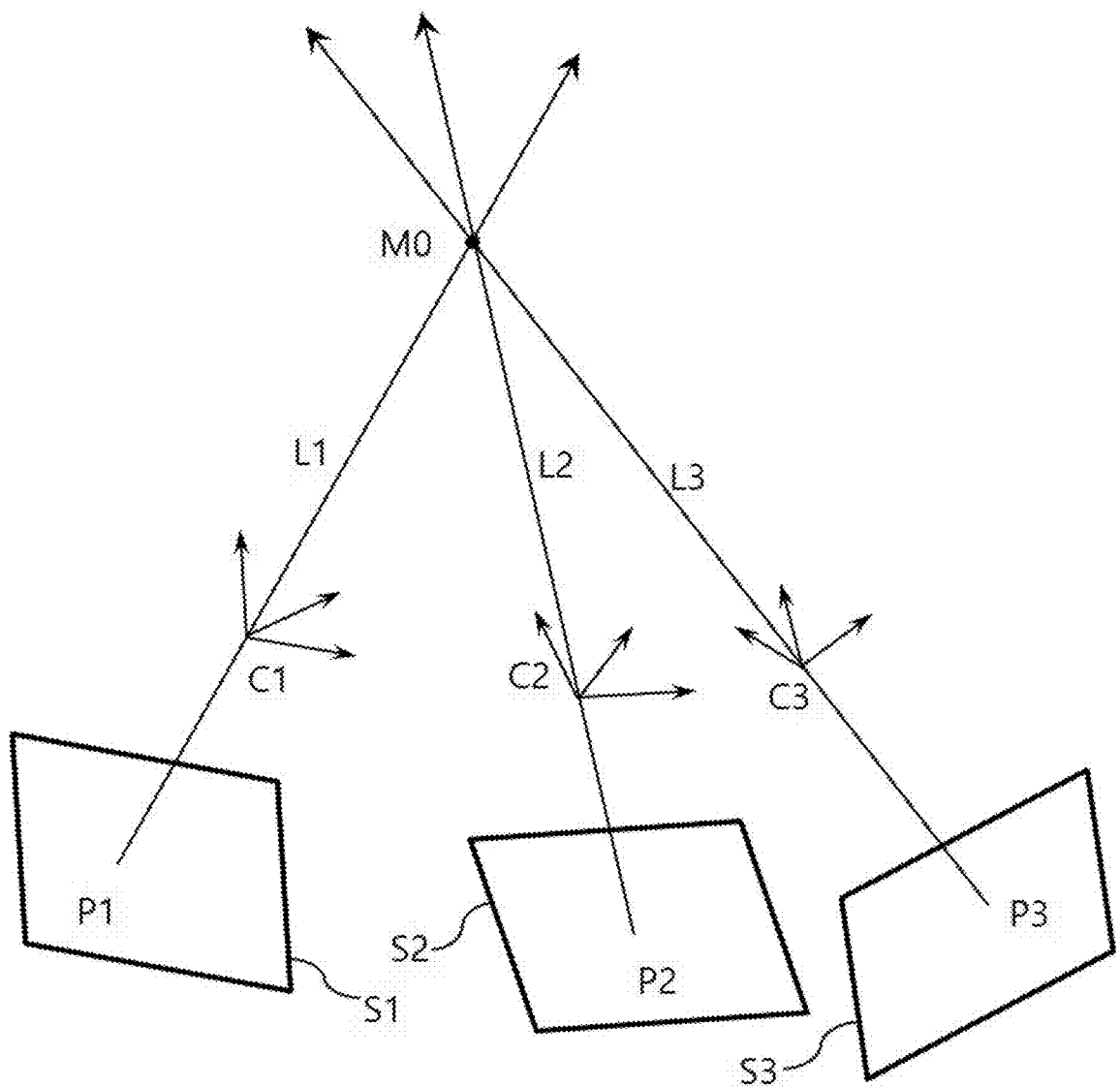
FIGS. 5 and 6 are diagrams for describing operation of the apparatuses and methods according to embodiments of the present disclosure.
Figure 6:
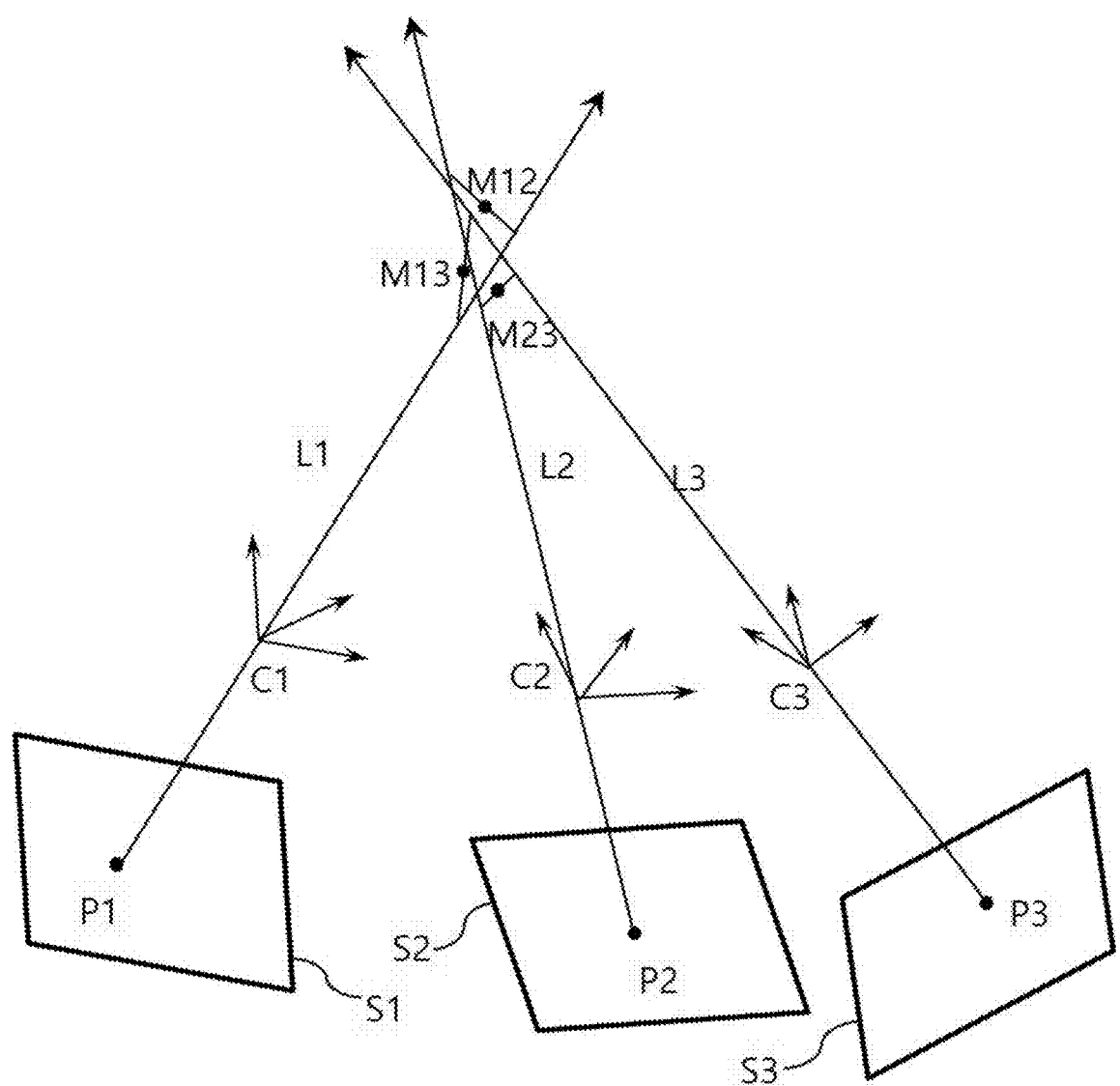

FIGS. 5 and 6 illustrate projection points P1, P2, and P3 and projection surfaces S1, S2, and S3 calculated by using a target position commonly marked on three photographic images and camera information.

While the projection surfaces S1, S2, and S3 having a rectangular shape are illustrated as an example in FIGS. 5 and 6, projection surfaces may also be curved surfaces according to circumstances. In addition, as there may be distortion between an actual subject and a photographic image projected onto a projection surface, an error may occur when mapping a target position to the projection points P1, P2, and P3 of the projection surfaces S1, S2, and S3. The projection point calculation module 300 may also calculate locations of the projection points P1, P2, and P3 by reducing an error in consideration of the above distortion.

The imaginary straight line calculation module 400 calculates imaginary straight lines L1, L2, and L3 respectively connecting the projection points P1, P2, and P3 to a camera position of camera information (projection center points (view points, 3D locations of optical center points) C1, C2, and C3) (step (d); S400). The camera information module 200 has acquired the projection center points C1, C2, and C3 of the camera, and the projection point calculation module 300 has calculated the projection points P1, P2, and P3. Then the imaginary straight line calculation module 400 may respectively calculate the imaginary straight lines L1, L2, and L3 connecting two points in a three-dimensional space (the camera projection center points C1, C2, and C3 and the projection points P1, P2, and P3).

Referring to FIG. 5, the imaginary straight lines L1, L2, and L3 theoretically meet with each other at a target position M0. For example, the target position M0 selected from photographic images captured at different positions correspond to a same point in the three-dimensional space, and thus, all of the straight lines connected from each position of the camera (the projection center points C1, C2, and C3) to the projection points P1, P2, and P3 pass by the same target position or target position, the point M0, as illustrated in FIG. 5.

According to this principle, the target position calculation module 500 determines locations of a point that is in a region where a distance between the point and the imaginary straight lines L1, L2, and L3 is the shortest, as three-dimensional locations of the target position M0 (step (e); S500). As described above, all the imaginary straight lines L1, L2, and L3 meet with each other at the target position M0 theoretically. A point where the imaginary straight lines L1, L2, and L3 cross with each other is the target position M0 as illustrated in FIG. 5. In this case, the target position calculation module 500 determines locations of the point at which the imaginary straight lines L1, L2, and L3 cross as locations of the target position M0.

When calculating the imaginary straight lines L1, L2, and L3 by using the imaginary straight line calculation module 400 by using photographic images actually captured using a camera, the imaginary straight lines L1, L2, and L3 may not cross as illustrated in FIG. 6. The three-dimensional locations calculating apparatus 1000 using photographic images, according to the present embodiment, is directed to indirectly estimate three-dimensional locations by using two-dimensional photographic images, and thus various errors may occur during estimation of three-dimensional locations. For example, an error may occur while receiving image locations via the image locations module 100. In some instances, when receiving image locations of a target position marked on respective photographic images, photographic image location values of the target position may have an error. In particular, the image locations module 100 may receive image locations having an error when a user clicks a target position on each photographic image by using an inputting device such as mouse. Also when the camera information module 200 acquires camera information, errors may be generated to some extent as the camera information module 200 calculates camera information by using a computer SfM method or by using measurement values obtained from various sensors.

Due to the errors occurring due to various factors as described above, the imaginary straight lines L1, L2, and L3 calculated using the imaginary straight line calculation module 400 may not intersect with each other as illustrated in FIG. 6.

In this case, the target position calculation module 500 determines three-dimensional locations of a target position by using various mathematical or statistical methods.

For example, as illustrated in FIG. 6, two lines among the imaginary straight lines L1, L2, and L3 may be selected and segments that interconnect the imaginary straight lines L1, L2, and L3 by a shortest distance may be determined. Points M12, M13, and M23 bisecting segments as described above may be points that are at a shortest distance from the imaginary straight lines L1, L2, and L3, to which the points M12, M13, and M23 respectively correspond.

The target position calculation module 500 may determine three-dimensional locations of a target position by applying statistical standards to locations of the bisection points M12, M13, and M23 of the shortest segment as described above. For example, one of statistical representative values such as an average, an intermediate value, or a median may be determined as three-dimensional locations of a target position. Also, a method of determining locations of a target position by excluding an outlier that exceeds allowable limits of error, based on normal distribution and standard deviation, may be used.

In addition, the target position calculation module 500 may use a method of determining three-dimensional locations of a target position by applying various standards to points which are in a particular area in a three-dimensional space and at a shortest distance from the imaginary straight lines L1, L2, and L3.

According to the three-dimensional locations calculating apparatus 1000 using photographic images, and the three-dimensional locations calculation method, by using photographic images, as described above, by calculating locations of two target positions, a distance between the target positions may also be easily calculated.

Figure 2:
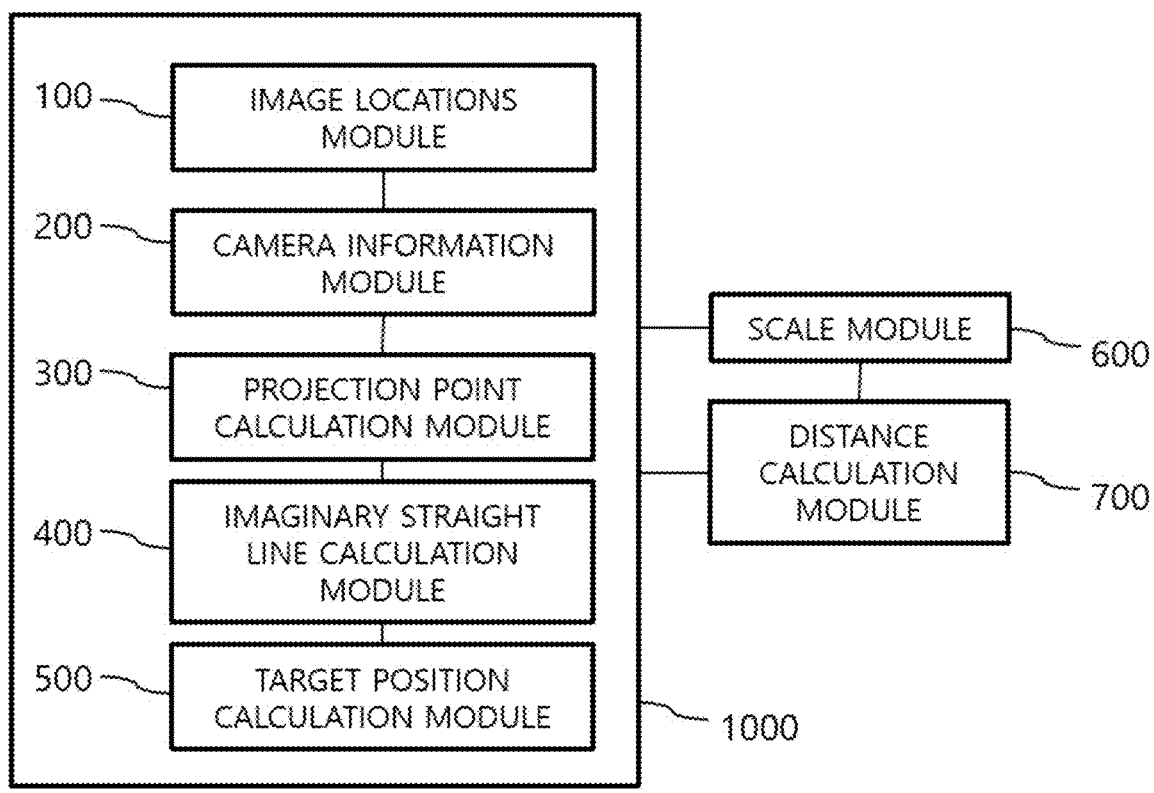
FIG. 2 is a block diagram of a three-dimensional distance measuring apparatus using photographic images, according to an embodiment of the present disclosure.
Figure 4:
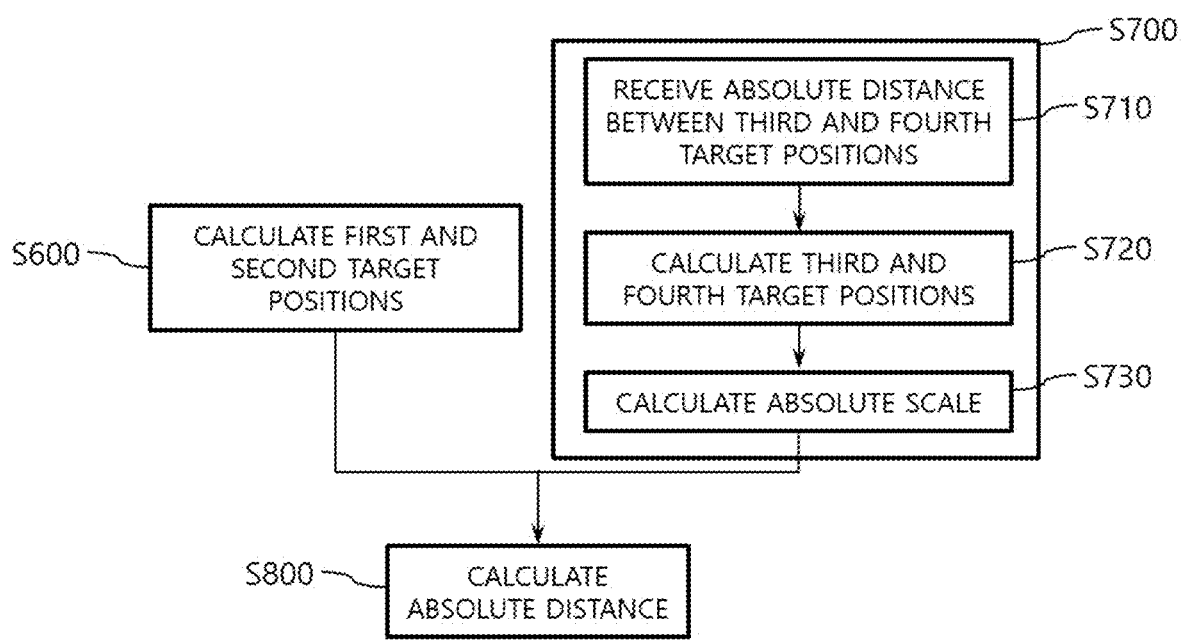
FIG. 4 is a flowchart of a three-dimensional distance measurement method, by using photographic images, according to an embodiment of the present disclosure.

FIG. 2 is a block diagram of a three-dimensional distance measuring apparatus using photographic images, according to an embodiment of the present disclosure. FIG. 4 is a flowchart of a three-dimensional distance measurement method, by using photographic images, according to an embodiment of the present disclosure.

Referring to FIG. 2, the three-dimensional distance measuring apparatus using photographic images, according to the present embodiment, may also include the image locations module 100, the camera information module 200, the projection point calculation module 300, the imaginary straight line calculation module 400, and the target position calculation module 500 of the three-dimensional locations calculating apparatus 1000 using photographic images, described with reference to FIG. 1, and may further include a scale module 600 and a distance calculation module 700.

The scale module 600 acquires an absolute scale whereby a relative distance between two points in a three-dimensional space may be converted into an absolute distance (step (g); S700). An absolute scale is a ratio of a relative distance to an absolute distance. An absolute distance between two target positions may be calculated by multiplying a relative distance between the two target positions by an absolute scale.

Various methods may be used to acquire an absolute scale by using the scale module 600.

First, the scale module 600 may receive an absolute scale input by a user by using an inputting device, and use the absolute scale.

Second, a method of calculating a distance between two points (a third target position and a fourth target position), an absolute distance of which is known. First, the scale module 600 receives an absolute distance between the third target position and the fourth target position (step (g-1); S710). Three-dimensional locations of the third target position and the fourth target position, the absolute distance between which is known, are respectively calculated using the above-described method (step (g-2); S720). By calculating a relative distance between the third target position and the fourth target position based on the three-dimensional locations of the third target position and the fourth target position calculated by the scale module 600 and using the already known absolute distance, an absolute scale may be calculated (step (g-3); S730).

Third, similarly to the second method above, standard marks may be used to calculate an absolute scale. Standard marks arranged at intervals of an absolute unit distance such as 1 meter or 10 centimeters are placed in a photographing site. When capturing a photographic image of a space to be measured, the standard marks marked in the photographing site are also photographed. A relative distance is calculated by designating the standard marks as a third target position and a fourth target position in captured photographic images. Here, by capturing photographic images by marking the standard marks in the photographing site in a form that is automatically recognized by the scale module 600, the scale module 600 may calculate an absolute scale by automatically recognizing the standard marks from the photographic images.

When the absolute scale is provided using the scale module 600 as described above, an absolute distance between any two arbitrary target positions may be calculated. By respectively performing steps (a) through (e) (S100 through S500) by using the image locations module 100, the camera information module 200, the projection point calculation module 300, the imaginary straight line calculation module 400, and the target position calculation module 500 in the above-described method, three-dimensional locations of a first target position and a second target position are respectively calculated (step (f); S600). The distance calculation module 700 calculates an absolute distance between the first target position and the second target position by using the absolute scale acquired using the scale module 600 and the three-dimensional locations of the first target position and the second target position (step (h); S800).

According to the method as described above, a distance between two points in a space may be measured at remarkably low costs within the appropriate limits of error. For example, instead of measuring a distance between target positions by using a measurement device such as a tape measure by visiting the site every time, a distance between arbitrary points may be measured just by using previously captured pictures. According to embodiments of the present disclosure, each time when measurement is required, there is no need to visit the site again, and distance measurement may be performed using just previously captured pictures. In addition, since just capturing photographic images simply allows measurement of a distance between arbitrary points, distances between two points that are additionally needed to be measured during an ongoing project may be measured easily without revisiting the site.

As described above, according to the present disclosure, time and efforts may be significantly reduced when conducting tasks such as architectural design or remodeling and productivity may be increased.

In addition, the present disclosure may also be used in verifying an error of a construction work process. By storing repeatedly captured photographic images of a construction site in a construction work process, changes in dimensions of the construction site according to the construction process may be detected according to the present disclosure. In the event a problem occurs after completion of the construction, whether there was an error in the dimensions in the process of construction may be easily inspected just by using the captured photographic images of the construction site.

While the present disclosure has been described with reference to embodiments, the scope of the present disclosure is not limited to the above described and illustrated structures.

For example, the use of photographic images captured using a camera has been described above, according to the present disclosure, photographic images may be acquired not only by using a typical digital camera. Photographic images captured using a three-dimensional scanner may also be used for implementation of the present disclosure. Like digital cameras, a three-dimensional scanner acquires a photographic image of a photographing subject, and acquires shape information of a three-dimensional object by measuring depths of points of interest in each pixel of photographic images. According to three-dimensional information measured using a three-dimensional scanner, shapes are crushed at edge portions where surfaces meet, and thus, measuring a distance may be difficult or the measurement may not be accurate. Here, by applying the present disclosure to photographic image information provided using the three-dimensional scanner, locations of a target position or a distance between target positions may be calculated effectively. Embodiments of the present disclosure may be used as a supplement or an alternative to a result of a three-dimensional scanner to further improve distance measurement performance.

According to the three-dimensional locations calculating apparatus using photographic images and the three-dimensional locations calculation method, by using photographic images, according to the present disclosure, three-dimensional locations of arbitrary points marked on photographic images may be easily calculated by using photographic images captured by a camera.

In addition, according to the three-dimensional distance measuring apparatus using photographic images and the three-dimensional distance measurement method, by using photographic images, according to the present disclosure, a distance between two arbitrary points marked on photographic images may be easily measured by using photographic images captured by a camera.

Figure 7:
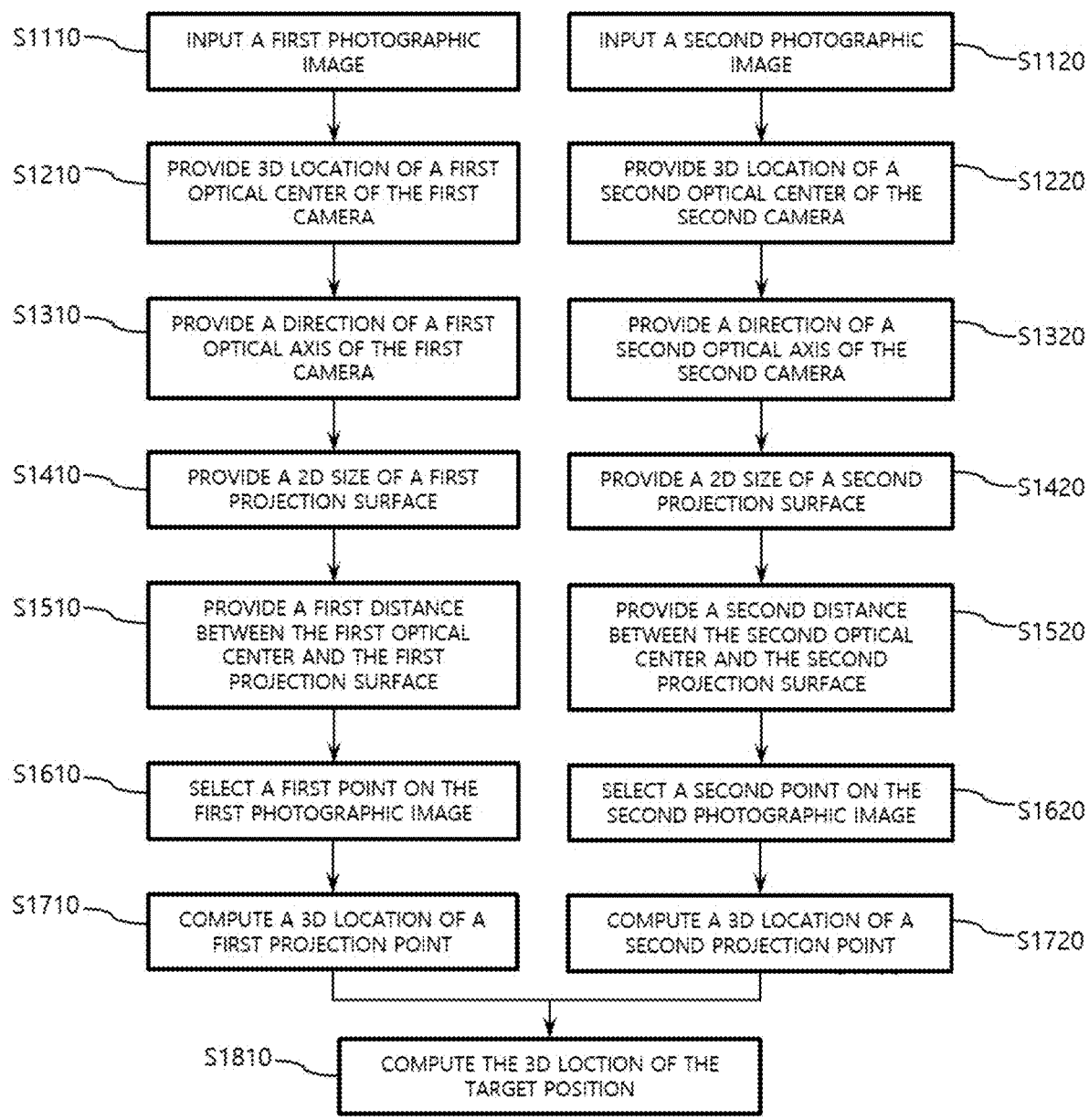
FIG. 7 is a flowchart of a method of processing two or more different photographs according to an embodiment of the present disclosure.
Figure 8:
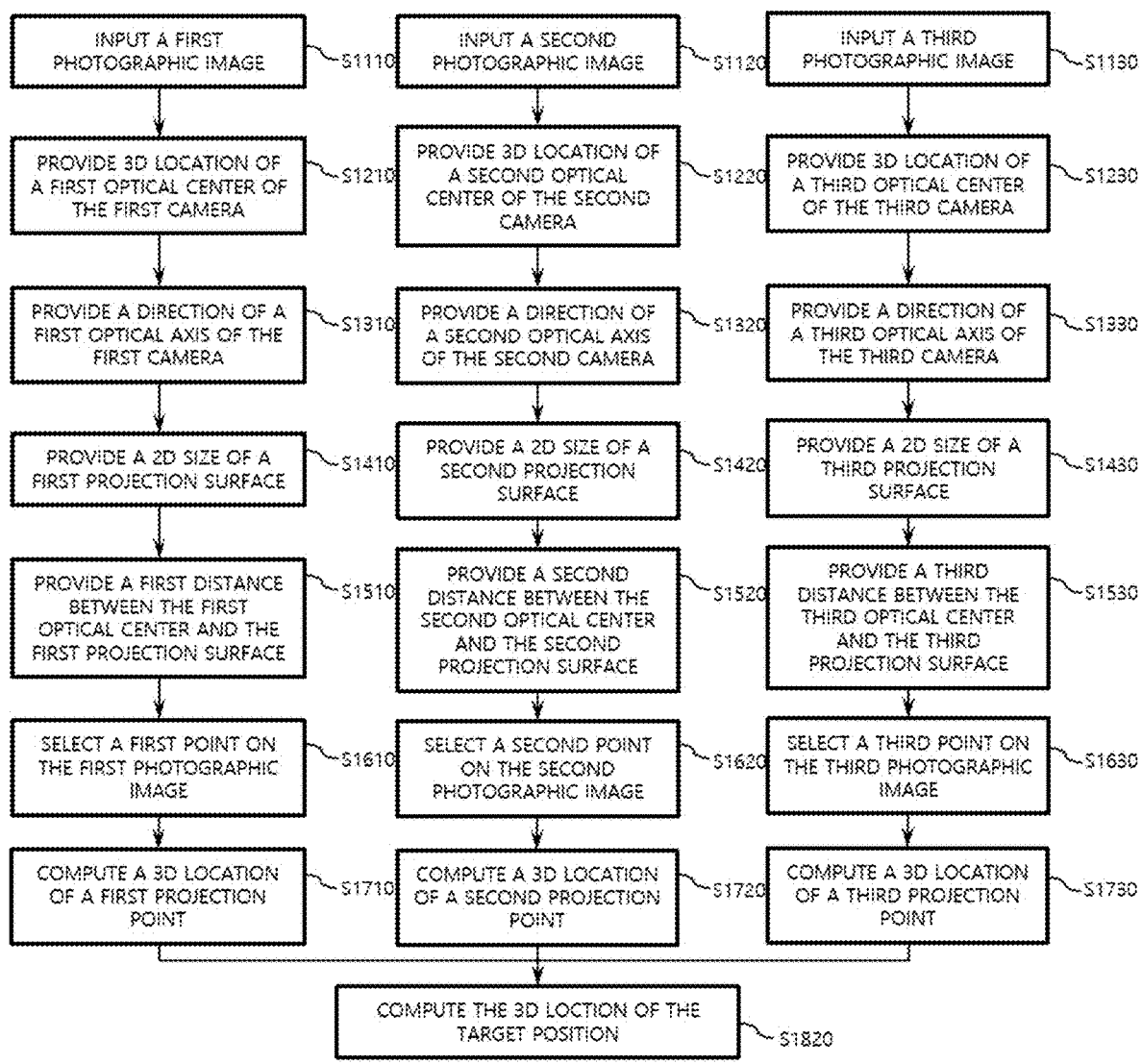
FIG. 8 is a flowchart of a method of processing two or more different photographs according to another embodiment of the present disclosure.

Referring to FIGS. 7 and 8 show flowcharts of a method of processing two or more different photographs to determine a three-dimensional location of a feature commonly captured in the two or more different photographs. The method includes: inputting, to a computerized system, a first photographic image of a place taken by a first camera or first data representing the first photographic image (S1110); inputting, to the computerized system, a second photographic image of the place taken by a second camera or second data representing the second photographic image (S1120); providing, to the computerized system, a three-dimensional (3D) location (or 3D coordinate) of a first optical center of the first camera at the time the first photographic image was taken (S1210); providing, to the computerized system, a 3D location of a second optical center of the second camera at the time the second photographic image was taken (S1220); providing, to the computerized system, a direction of a first optical axis of the first camera at the time the first photographic image was taken (S1310); providing, to the computerized system, a direction of a second optical axis of the second camera at the time the second photographic image was taken (S1320); providing, to the computerized system, a two-dimensional (2D) size of a first projection surface, on which an optical image is projected inside the first camera for capturing the optical image, or information leading to the 2D size of the first projection surface of the first camera (S1410); providing, to the computerized system, a 2D size of a second projection surface, on which an optical image is projected inside the second camera for capturing the optical image, or information leading to the 2D size of the second projection surface of the second camera (S1420); providing, to the computerized system, a first distance between the first optical center and the first projection surface along the first optical axis or information leading to the first distance of the first camera (S1510); providing, to the computerized system, a second distance between the second optical center and the second projection surface along the second optical axis or information leading to the second distance of the second camera (S1520); receiving a first selection of a first point representing a target position of the place on the first photographic image displayed on at least one display screen of the computerized system (S1610); and receiving a second selection of a second point representing the target position on the second photographic image displayed on the at least one display screen of the computerized system (S1620). The method further includes causing at least one processor of the computerized system to execute computer software stored in at least one memory of the computerized system to perform the following: processing the first photographic image, the 2D size of the first projection surface, the direction of the first optical axis, and the first distance to compute a 3D location of a first projection point at which the target position of the place would have been projected on the first projection surface, or on an imaginary plane parallel to the first projection surface, at the time the first photographic image was taken by the first camera (S1710), processing the second photographic image, the 2D size of the second projection surface, the direction of the second optical axis, and the second distance to compute a 3D location of a second projection point at which the target position of the place would have been projected on the second projection surface, or an imaginary plane parallel to the second projection surface, at the time the second photographic image was taken by the second camera (S1720), and processing the 3D location of the first projection point, the 3D location of the first optical center, the 3D location of the second projection point, and the 3D location of the second optical center to compute a 3D location of the target position of the place as a first imaginary straight line passing the 3D location of the first projection point and the 3D location of the first optical center would also pass or pass by the target position and further a second imaginary straight line passing the 3D location of the second projection point and the 3D location of the second optical center would also pass or pass by the target position such that the first imaginary straight line and the second imaginary straight line cross or are close to each other at or near the target position, wherein the 3D location defines a location relative to a reference point in a 3D space (S1810).

Referring to FIG. 8, the method additionally includes: inputting, to the computerized system, a third photographic image of a place taken by a third camera or third data representing the third photographic image (S1130); providing, to the computerized system, a 3D location of a third optical center of the third camera at the time the third photographic image was taken (S1230); providing, to the computerized system, a direction of a third optical axis of the third camera at the time the third photographic image was taken (S1330); providing, to the computerized system, a 2D size of a third projection surface, on which an optical image is projected inside the third camera for capturing the optical image, or information leading to the 2D size of the third projection surface of the third camera (S1430); providing, to the computerized system, a third distance between the third optical center and the third projection surface along the third optical axis or information leading to the third distance of the third camera (S1530); receiving a third selection of a third point representing the target position on the third photographic image displayed on at least one display screen of the computerized system (S1630); and causing at least one processor of the computerized system to execute computer software stored in at least one memory of the computerized system to perform the following: processing the third photographic image, the 2D size of the third projection surface, the direction of the third optical axis, and the third distance to compute a 3D location of a third projection point at which the target position of the place would have been projected on the third projection surface, or on an imaginary plane parallel to the third projection surface, at the time the third photographic image was taken by the third camera (S1730), processing the 3D location of the third projection point, and the 3D location of the third optical center to compute the 3D location of the target position of the place as third imaginary straight line passing the 3D location of the third projection point and the 3D location of the third optical center would also pass or pass by the target position such that the third imaginary straight line and the first imaginary straight line cross or are close to each other at or near the target position and further such that the third imaginary straight line and the second imaginary straight line cross or are close to each other at or near the target position (S1820).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of processing two or more different photographs to determine a three-dimensional location of a feature commonly captured in the two or more different photographs, the method comprising:

inputting, to a computerized system, a first photographic image of a place taken by a first camera or first data representing the first photographic image;

inputting, to the computerized system, a second photographic image of the place taken by a second camera or second data representing the second photographic image;

providing, to the computerized system, a three-dimensional (3D) location of a first optical center of the first camera at the time the first photographic image was taken;

providing, to the computerized system, a 3D location of a second optical center of the second camera at the time the second photographic image was taken;

providing, to the computerized system, a direction of a first optical axis of the first camera at the time the first photographic image was taken;

providing, to the computerized system, a direction of a second optical axis of the second camera at the time the second photographic image was taken;

providing, to the computerized system, a two-dimensional (2D) size of a first projection surface, on which an optical image is projected inside the first camera for capturing the optical image, or information leading to the 2D size of the first projection surface of the first camera;

providing, to the computerized system, a 2D size of a second projection surface, on which an optical image is projected inside the second camera for capturing the optical image, or information leading to the 2D size of the second projection surface of the second camera;

providing, to the computerized system, a first distance between the first optical center and the first projection surface along the first optical axis or information leading to the first distance of the first camera;

providing, to the computerized system, a second distance between the second optical center and the second projection surface along the second optical axis or information leading to the second distance of the second camera;

receiving, from a user input device, a first selection of a first point representing a target position of the place on the first photographic image displayed on at least one display screen of the computerized system;

receiving, from the user input device, a second selection of a second point representing the target position on the second photographic image displayed on the at least one display screen of the computerized system; and causing at least one processor of the computerized system to execute computer software stored in at least one memory of the computerized system to perform the following:

processing the first photographic image, the 2D size of the first projection surface, the direction of the first optical axis, and the first distance to compute a 3D location of a first projection point on the first projection surface, or on a first imaginary plane parallel to the first projection surface, that corresponds to the first point on the first photographic image, processing the second photographic image, the 2D size of the second projection surface, the direction of the second optical axis, and the second distance to compute a 3D location of a second projection point on the second projection surface, or a second imaginary plane parallel to the second projection surface, that corresponds to the second point on the second photographic image, and processing the 3D location of the first projection point, the 3D location of the first optical center, the 3D location of the second projection point, and the 3D location of the second optical center to compute a 3D location of the target position of the place as a first imaginary straight line passing the 3D location of the first projection point and the 3D location of the first optical center also pass or pass by the target position and further a second imaginary straight line passing the 3D location of the second projection point and the 3D location of the second optical center also pass or pass by the target position such that the first imaginary straight line and the second imaginary straight line cross or are close to each other at or near the target position, wherein the 3D location defines a location relative to a reference point in a 3D space, wherein processing to compute the 3D location of the first projection point on the first projection surface comprises:

processing the first photographic image to determine a 2D size of the first photographic image;

processing the first photographic image to determine a 2D location of the first point on the first photographic image;

subsequently, processing the 2D size of the first projection surface, the 2D size of the first photographic image, and the 2D location of the first point on the first photographic image to determine a 2D location of the first projection point on the first projection surface that corresponds to the first point on the first photographic image; and subsequently, processing the direction of the first optical axis, the 3D location of the first optical center, the first distance, and the 2D location of the first projection point on the first projection surface to determine the 3D location of the first projection point, wherein the 2D location defines a location relative to a reference point in a 2D plane, wherein in determining the 2D location of the first projection point on the first projection surface, the 2D size of the first projection surface and the 2D size of the first photographic image are used to provide a ratio therebetween.

2. The method of claim 1, wherein the second camera is the first camera or another camera, wherein the first photographic image and the second photographic image are two-dimensional images of the place and taken from different locations of the place such that some features of the place are depicted in both of the first photographic image and the second photographic image.

3. The method of claim 1, wherein determining the 2D location of the first projection point on the first projection surface further comprises mapping the first point on the first photographic image on the first projection surface in view of the ratio between the 2D size of the first projection surface and the 2D size of the first photographic image.

4. The method of claim 3, wherein the first point on the first photographic image is mapped on the first projection surface given that the first projection point on the first projection surface and the first point on the first photographic image are point symmetric to the first optical axis.

5. The method of claim 1, wherein in determining the 3D location of the first projection point, the direction of the first optical axis is used to determine an orientation of the first projection surface at the time the first photographic image was taken as the direction of the first optical axis is perpendicular to the first projection surface.

6. The method of claim 5, wherein in determining the 3D location of the first projection point, the 3D location of the first optical center and the first distance are used to provide a 3D location of the first projection surface in the 3D space.

7. The method of claim 6, wherein the 2D location of the first projection point on the first projection surface and the 3D location of the first projection surface are processed to provide the 3D location of the first projection point in the 3D space.

8. The method of claim 1, wherein processing to compute the 3D location of the second projection point comprises:

processing the second photographic image to determine a 2D size of the second photographic image;

processing the second photographic image to determine a 2D location of the second point on the second photographic image;

subsequently, processing the 2D size of the second projection surface, the 2D size of the second photographic image, and the 2D location of the second point on the second photographic image to determine a 2D location of the second projection point on the second projection surface that corresponds to the second point on the second photographic image; and subsequently, processing the direction of the second optical axis, the 3D location of the second optical center, the second distance, and the 2D location of the second projection point on the second projection surface to determine the 3D location of the second projection point, wherein the 2D location defines a location relative to a reference point in a 2D plane.

9. A method of processing two or more different photographs to determine a three-dimensional location of a feature commonly captured in the two or more different photographs, the method comprising:

inputting, to a computerized system, a first photographic image of a place taken by a first camera or first data representing the first photographic image;

inputting, to the computerized system, a second photographic image of the place taken by a second camera or second data representing the second photographic image;

providing, to the computerized system, a three-dimensional (3D) location of a first optical center of the first camera at the time the first photographic image was taken;

providing, to the computerized system, a 3D location of a second optical center of the second camera at the time the second photographic image was taken;

providing, to the computerized system, a direction of a first optical axis of the first camera at the time the first photographic image was taken;

providing, to the computerized system, a direction of a second optical axis of the second camera at the time the second photographic image was taken;

providing, to the computerized system, a two-dimensional (2D) size of a first projection surface, on which an optical image is projected inside the first camera for capturing the optical image, or information leading to the 2D size of the first projection surface of the first camera;

providing, to the computerized system, a 2D size of a second projection surface, on which an optical image is projected inside the second camera for capturing the optical image, or information leading to the 2D size of the second projection surface of the second camera;

providing, to the computerized system, a first distance between the first optical center and the first projection surface along the first optical axis or information leading to the first distance of the first camera;

providing, to the computerized system, a second distance between the second optical center and the second projection surface along the second optical axis or information leading to the second distance of the second camera;

receiving, from a user input device, a first selection of a first point representing a target position of the place on the first photographic image displayed on at least one display screen of the computerized system;

receiving, from the user input device, a second selection of a second point representing the target position on the second photographic image displayed on the at least one display screen of the computerized system; and causing at least one processor of the computerized system to execute computer software stored in at least one memory of the computerized system to perform the following:

processing the first photographic image, the 2D size of the first projection surface, the direction of the first optical axis, and the first distance to compute a 3D location of a first projection point on the first projection surface, or on a first imaginary plane parallel to the first projection surface, that corresponds to the first point on the first photographic image, processing the second photographic image, the 2D size of the second projection surface, the direction of the second optical axis, and the second distance to compute a 3D location of a second projection point on the second projection surface, or a second imaginary plane parallel to the second projection surface, that corresponds to the second point on the second photographic image, and processing the 3D location of the first projection point, the 3D location of the first optical center, the 3D location of the second projection point, and the 3D location of the second optical center to compute a 3D location of the target position of the place as a first imaginary straight line passing the 3D location of the first projection point and the 3D location of the first optical center also pass or pass by the target position and further a second imaginary straight line passing the 3D location of the second projection point and the 3D location of the second optical center also pass or pass by the target position such that the first imaginary straight line and the second imaginary straight line cross or are close to each other at or near the target position, wherein the 3D location defines a location relative to a reference point in a 3D space, wherein processing to compute the 3D location of the first projection point on the first imaginary plane parallel to the first projection surface comprises:

processing the first photographic image to determine a 2D size of the first photographic image;

processing the first photographic image to determine a 2D location of the first point on the first photographic image;

subsequently, processing the 2D size of the first projection surface, the 2D size of the first photographic image, and the 2D location of the first point on the first photographic image, the first distance, and an imaginary projection distance between the first imaginary plane and the first optical center in the first optical axis to determine a 2D location of the first projection point on the first imaginary plane parallel to the first projection surface that corresponds to the first point on the first photographic image; and subsequently, processing the direction of the first optical axis, the 3D location of the first optical center, the first distance, and the 2D location of the first projection point on the first imaginary plane parallel to the first projection surface to determine the 3D location of the first projection point, wherein the 2D location defines a location relative to a reference point in a 2D plane.

10. The method of claim 9, wherein in determining the 2D location of the first projection point on the first imaginary plane, the first distance and the imaginary projection distance are used to provide a first ratio therebetween, and the 2D size of the first projection surface and the first ratio are used to provide a 2D size of the first imaginary plane.

11. The method of claim 10, wherein the 2D size of the first imaginary plane and the 2D size of the first photographic image are used to provide a second ratio therebetween.

12. The method of claim 11, wherein determining the 2D location of the first projection point on the first projection surface further comprises mapping the first point on the first photographic image on the first imaginary plane in view of the second ratio between the 2D size of the first imaginary plane and the 2D size of the first photographic image.

13. The method of claim 12, wherein the first point on the first photographic image is mapped on the first imaginary plane given that, the first projection point on the first imaginary plane and the first point on the first photographic image are point symmetric to the first optical axis.

14. The method of claim 1, wherein when the first imaginary straight line and the second imaginary straight line cross, the target position is a point where the first imaginary straight line and the second imaginary straight line cross in the 3D space.

15. The method of claim 1, wherein when the first imaginary straight line and the second imaginary straight line do not cross, computing the 3D location of the target position comprises:

determining a shortest straight line interconnecting between the first imaginary straight line and the second imaginary straight line; and determining the target position in the 3D space using the shortest straight line.

16. A method of processing two or more different photographs to determine a three-dimensional location of a feature commonly captured in the two or more different photographs, the method comprising:

inputting, to a computerized system, a first photographic image of a place taken by a first camera or first data representing the first photographic image;

inputting, to the computerized system, a second photographic image of the place taken by a second camera or second data representing the second photographic image;

providing, to the computerized system, a three-dimensional (3D) location of a first optical center of the first camera at the time the first photographic image was taken;

providing, to the computerized system, a 3D location of a second optical center of the second camera at the time the second photographic image was taken;

providing, to the computerized system, a direction of a first optical axis of the first camera at the time the first photographic image was taken;

providing, to the computerized system, a direction of a second optical axis of the second camera at the time the second photographic image was taken;

providing, to the computerized system, a two-dimensional (2D) size of a first projection surface, on which an optical image is projected inside the first camera for capturing the optical image, or information leading to the 2D size of the first projection surface of the first camera;

providing, to the computerized system, a 2D size of a second projection surface, on which an optical image is projected inside the second camera for capturing the optical image, or information leading to the 2D size of the second projection surface of the second camera;

providing, to the computerized system, a first distance between the first optical center and the first projection surface along the first optical axis or information leading to the first distance of the first camera;

providing, to the computerized system, a second distance between the second optical center and the second projection surface along the second optical axis or information leading to the second distance of the second camera;

receiving, from a user input device, a first selection of a first point representing a target position of the place on the first photographic image displayed on at least one display screen of the computerized system;

receiving, from the user input device, a second selection of a second point representing the target position on the second photographic image displayed on the at least one display screen of the computerized system; and causing at least one processor of the computerized system to execute computer software stored in at least one memory of the computerized system to perform the following:

processing the first photographic image, the 2D size of the first projection surface, the direction of the first optical axis, and the first distance to compute a 3D location of a first projection point on the first projection surface, or on a first imaginary plane parallel to the first projection surface, that corresponds to the first point on the first photographic image, processing the second photographic image, the 2D size of the second projection surface, the direction of the second optical axis, and the second distance to compute a 3D location of a second projection point on the second projection surface, or a second imaginary plane parallel to the second projection surface, that corresponds to the second point on the second photographic image, and processing the 3D location of the first projection point, the 3D location of the first optical center, the 3D location of the second projection point, and the 3D location of the second optical center to compute a 3D location of the target position of the place as a first imaginary straight line passing the 3D location of the first projection point and the 3D location of the first optical center also pass or pass by the target position and further a second imaginary straight line passing the 3D location of the second projection point and the 3D location of the second optical center also pass or pass by the target position such that the first imaginary straight line and the second imaginary straight line cross or are close to each other at or near the target position, wherein the 3D location defines a location relative to a reference point in a 3D space, inputting, to the computerized system, a third photographic image of a place taken by a third camera or third data representing the third photographic image;

wherein the third camera is the first camera, the second camera or another camera, wherein the third photographic image is a two-dimensional image of the place and taken from a different location from the first and second photographic images such that some features of the place are depicted in the first photographic image, the second photographic image and the third photographic image;

providing, to the computerized system, a 3D location of a third optical center of the third camera at the time the third photographic image was taken;

providing, to the computerized system, a direction of a third optical axis of the third camera at the time the third photographic image was taken;

providing, to the computerized system, a 2D size of a third projection surface, on which an optical image is projected inside the third camera for capturing the optical image, or information leading to the 2D size of the third projection surface of the third camera;

providing, to the computerized system, a third distance between the third optical center and the third projection surface along the third optical axis or information leading to the third distance of the third camera;

receiving, from the user input device, a third selection of a third point representing the target position on the third photographic image displayed on at least one display screen of the computerized system; and causing at least one processor of the computerized system to execute computer software stored in at least one memory of the computerized system to perform the following:

processing the third photographic image, the 2D size of the third projection surface, the direction of the third optical axis, and the third distance to compute a 3D location of a third projection point on the third projection surface, or on a third imaginary plane parallel to the third projection surface, that corresponds to the third point on the third photographic image, processing the 3D location of the third projection point, and the 3D location of the third optical center to compute the 3D location of the target position of the place as third imaginary straight line passing the 3D location of the third projection point and the 3D location of the third optical center also pass or pass by the target position such that the third imaginary straight line and the first imaginary straight line cross or are close to each other at or near the target position and further such that the third imaginary straight line and the second imaginary straight line cross or are close to each other at or near the target position, wherein when the third imaginary straight line and the first imaginary straight line do not cross and when the third imaginary straight line and the second imaginary straight line do not cross, computing the 3D location of the target position comprises:

determining a first shortest straight line interconnecting between the first imaginary straight line the second imaginary straight line;

determining a second shortest straight line interconnecting between the second imaginary straight line the third imaginary straight line;

determining a third shortest straight line interconnecting between the third imaginary straight line the first imaginary straight line; and determining the target position in the 3D space using the first shortest straight line, the second shortest straight line, and the third shortest straight line.

17. The method of claim 16, wherein the target position is determined within a space defined by the first shortest straight line, the second shortest straight line, and the third shortest straight line.

\* \* \* \* \*

UNITED STATES PATENT AND TRADEMARK OFFICE
CERTIFICATE OF CORRECTION

PATENT NO. : 10,825,198 B2  
APPLICATION NO. : 16/447665  
DATED : November 3, 2020  
INVENTOR(S) : SeockHoon Bae Page 1 of 1

It is certified that error appears in the above-identified patent and that said Letters Patent is hereby corrected as shown below:

In the Specification

In Column 12 at Line 20, change "*MO*." to --*M0*.--.

In Column 12 at Line 20, change "*MO*" to --*M0*--.

In Column 12 at Line 26, change "*MO*" to --*M0*--.

In Column 12 at Line 32, change "*MO*" to --*M0*--.

In Column 12 at Line 36, change "*MO*" to --*M0*--.

In Column 12 at Line 38, change "*MO*" to --*M0*--.

In Column 12 at Line 41, change "*MO*" to --*M0*.--.

In Column 15 at Line 13, change "*above described*" to --*above-described*--.

In the Claims

In Column 24 at Line 57, Claim 16, change "*line the*" to --*line and the*--.

In Column 24 at Lines 60-61, Claim 16, change "*line the*" to --*line and the*--.

In Column 24 at Line 63, Claim 16, change "*line the*" to --*line and the*--.

Signed and Sealed this  
Sixteenth Day of March, 2021

Drew Hirshfeld  
*Performing the Functions and Duties of the  
Under Secretary of Commerce for Intellectual Property and  
Director of the United States Patent and Trademark Office*